United States Patent
Barsoum

(10) Patent No.: US 12,057,554 B2
(45) Date of Patent: Aug. 6, 2024

(54) BATTERY WITH CERAMIC PARTICLES

(71) Applicant: Roshdy G. Barsoum, McLean, VA (US)

(72) Inventor: Roshdy G. Barsoum, McLean, VA (US)

( * ) Notice: Subject to any disclaimer, the term of this patent is extended or adjusted under 35 U.S.C. 154(b) by 546 days.

(21) Appl. No.: 17/300,350

(22) Filed: May 21, 2021

(65) Prior Publication Data
US 2022/0029202 A1 Jan. 27, 2022

Related U.S. Application Data

(60) Provisional application No. 63/055,943, filed on Jul. 24, 2020.

(51) Int. Cl.
  *H01M 10/08* (2006.01)
  *H01M 10/056* (2010.01)

(52) U.S. Cl.
  CPC ......... *H01M 10/08* (2013.01); *H01M 10/056* (2013.01); *H01M 2220/20* (2013.01); *H01M 2300/0091* (2013.01)

(58) Field of Classification Search
  CPC .................................................... H01M 10/08
  See application file for complete search history.

(56) References Cited

U.S. PATENT DOCUMENTS

| 3,379,570 | A | 4/1968 | Berger et al. |
| 7,766,975 | B2 | 8/2010 | Clamen et al. |
| 7,771,496 | B1 * | 8/2010 | Nakahara .......... H01M 10/0569 429/188 |
| 10,119,025 | B2 * | 11/2018 | Whear .................. H01M 10/10 |
| 2016/0043429 | A1 * | 2/2016 | Hatta .................... H02J 7/0068 429/188 |
| 2016/0141609 | A1 | 5/2016 | Mikuni et al. |
| 2021/0126298 | A1 | 4/2021 | Li et al. |

FOREIGN PATENT DOCUMENTS

| CN | 211480163 U | 4/2020 | |
| KR | 102103311 B1 * | 4/2020 | |
| WO | WO-2020244891 A1 * | 12/2020 | ............ H01M 10/06 |

OTHER PUBLICATIONS

KR102103311B1 Translation from Espacenet (Year: 2020).*
"Sol-Gel electrolytes in lithium batteries," Journal of Sol-Gel Science and Technology, vol. 2, Ogasawara et al, Abstract; Jan. 1994.
"A Survey of the Use of Ceramics in Battery . . . Applications," Army Materials and Mechanics Research Center, Watertown, MA; Brooman et al, AMMCR CTR 77-18; Jun. 1977.

* cited by examiner

*Primary Examiner* — Nathanael T Zemui

(57) ABSTRACT

A battery has anodes, cathodes, separators, and electrolyte. Particles of loose hydrated alkali aluminum silicate contact the anodes and cathodes and are immersed in the electrolyte, to enhance operability of the battery. The maximum dimensions of at least a majority of the particles are between about 5-10 mm, and they range in shape from spherical to irregular.

17 Claims, 1 Drawing Sheet

BATTERY WITH CERAMIC PARTICLES

CROSS-REFERENCE TO RELATED APPLICATION

This application claims the benefit of U.S. Provisional Application Ser. No. 63/055,943 filed Jul. 24, 2020.

BACKGROUND AND SUMMARY OF THE INVENTION

There have been instances in the past where ceramics have been used in conventional batteries, such as lead-acid and lithium-ion batteries. For example as long ago as 1977 ceramics have been contemplated for use as separator, spacer, or matrix components in batteries; or as a solid electrolyte; or for seals and electrical insulation components (Army Materials and Mechanics Research Center, AMMRC CTR 77-18, Jun. 1977, "A Survey of the Use of Ceramics in Battery and Fuel Cell Applications," page 5), and as early as 1968 sintered aluminosilicate has been proposed as a battery separator (U.S. Pat. No. 3,379,570). More recently zeolite-like materials and aluminosilicate have been used in lithium-ion batteries as a solid or gel electrolyte ("Sol-gel electrolytes in lithium batteries," Ogasawara et al, 1994), aluminum silicate fiber is known to be used as a membrane in $Li-O_2$ batteries (https://www.sciencedirect.com/science/article/abs/pii/S2468606920301040), zeolite is known to be used as a gas-adsorbent in lithium-ion cells (US 2021/0126298), alkali aluminum silicate has been used as part of a wrap for battery separators (U.S. Pat. No. 7,766,975), and an aluminum silicate and carbon complex has been used as an electroconductive material for a lithium-ion secondary battery (US 2016/0141609). In none of these uses is the ceramic material in loose particulate form in a liquid or gel electrolyte, and contacting both the anode and cathode of the battery.

According to the present invention, the operability of a battery, such as lead-acid or lithium-ion batteries, can be enhanced by providing a specific type of ceramic material in particulate form within each of the battery cells, immersed in a liquid or gel electrolyte and contacting both the anode and cathode of the battery cell. The specific ceramic material effective for this purpose comprises hydrated alkali aluminum silicate. While the exact particle sizes and shapes are not necessarily critical the alkali aluminum silicate loose particles are unambiguously effective when at least the majority of the particles are of different sizes with maximum dimensions of about 5 mm-10 mm, with varying shapes ranging from substantially spherical to completely irregular. The alkali aluminum silicate particles may have as their origin zeolite, kyanite, sillimanite, and/or andalusite.

While the batteries according to the invention can be used for any purpose to which a battery can be put, they are particularly desirable for use in vehicles including electric land vehicles (EVs), unmanned underwater vehicles (UUVs), unmanned air vehicles (UAVs), and unmanned surface vehicles (USVs).

According to one aspect of the invention an electrochemical cell is provided comprising the conventional components of an anode, a cathode, a separator between the anode and cathode, and a liquid or gel electrolyte surrounding the anode and cathode. Heretofore unknown in the art according to the invention a plurality of hydrated alkali aluminum silicate substantially loose particles are disposed in the electrolyte and the particles contact both the anode and the cathode. The alkali aluminum silicate particles enhance the operability of the electrochemical cell. The majority (and preferably substantially all) of the alkali aluminum silicate particles may have approximate maximum dimensions between about 5-10 mm with shapes ranging from substantially spherical to completely irregular. The anode may be a plate comprising lead oxide, the cathode a plate comprising lead, and the electrolyte may contain sulfuric acid. Alternatively, the anode may comprise a porous carbon, the cathode may comprise a metal oxide, and the electrolyte may comprise a lithium salt in an organic solvent. The source of the alkali aluminum silicate may be selected from the group consisting essentially of zeolite, kyanite, sillimanite, and/or andalusite.

The invention also contemplates a plurality of electrochemical cells as described above connected in series or parallel and contained within a common casing to provide a battery. The battery may be a lead-acid, lithium-ion, nickel-cadmium, or the like, battery. As earlier indicated the battery may comprise one of a plurality of batteries for an EV, UUV, UAV, or USV.

According to another aspect of the invention there is provided a battery comprising a plurality of positive electrodes separated from a plurality of negative electrodes, all connected in series or parallel; and a plurality of substantially loose particles of hydrated alkali aluminum silicate contacting the positive and negative electrodes.

According to yet another aspect of the invention there is provided a method of facilitating operation of a battery having a plurality of operatively connected electrochemical cells each including an anode and a cathode separated by a separator. The method comprises introducing a plurality of loose particles of hydrated alkali aluminum silicate into contact with both the anode and cathode of at least some (preferably all) of the cells. Where the battery is an existing battery having a liquid or gel electrolyte the method further comprises removing and replacing the electrolyte before introducing the particles. Where the battery is a new battery the method further comprises introducing liquid or gel electrolyte into the cells, before, after, or substantially simultaneously with, the introduction of the particles. The method is preferably practiced so that the majority (preferably substantially all) of the alkali aluminum silicate particles introduced have approximate maximum dimensions between about 5-10 mm with shapes ranging from substantially spherical to completely irregular It is the primary object of the present invention to enhance the operability of an electrochemical cell, or a battery made from a plurality of electrochemical cells, such as by extending its discharge capabilities, by providing particles of hydrated alkali aluminum silicates in contact with cell components. This and other objects of the invention will become clear from the detailed description of the drawings and from the appended claims.

DETAILED DESCRIPTION OF THE DRAWINGS

Figure 1:
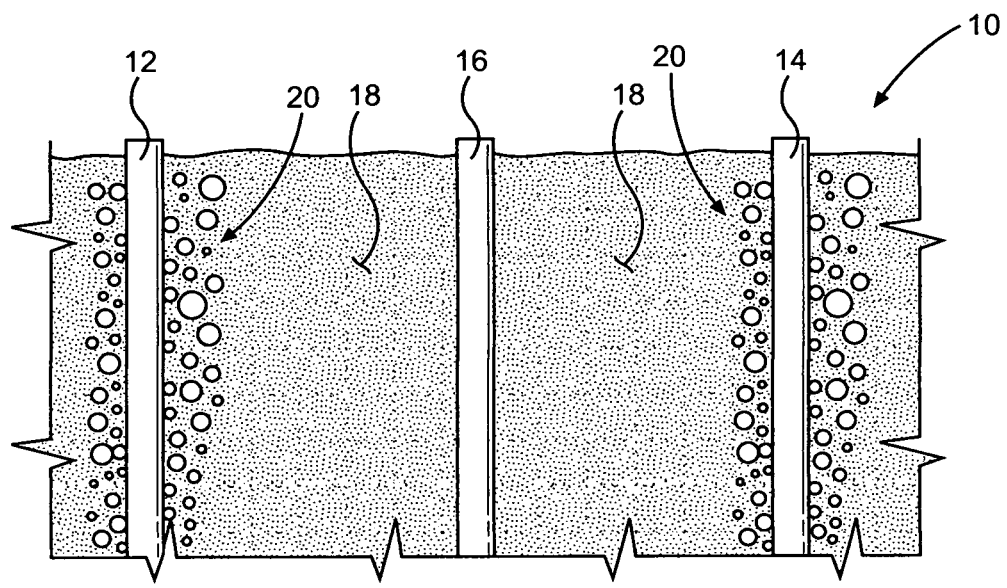
FIG. 1 is a schematic side view of the operative components of an exemplary electrochemical cell according to the present invention.

At 10, FIG. 1 schematically depicts an electrochemical cell according to the present invention. The cell 10 includes the conventional components of an anode 12, a cathode 14, and a separator 16 separating the anode 12 from the cathode 14. The anode 12, cathode 14, and separator 16 are disposed in a liquid or gel electrolyte 18. According to the present invention a plurality of substantially loose ceramic particles 20 are provided in the cell 10 immersed in electrolyte 18, the particles 20 contacting both the anode 12 and the cathode 14. The particles 20 comprise particles of hydrated alkali aluminum silicate. The majority (preferably substantially all) of the particles 20 preferably have about 5-10 mm as their maximum dimensions, and they may have shapes ranging from substantially spherical to completely irregular.

Where the cell 10 is a cell of a lead-acid battery, the anode 12 may be a conventional plate comprising lead oxide, the cathode 14 may be a conventional plate comprising lead, and the electrolyte 18 contains sulfuric acid (e. g. sulfuric acid and distilled water).

On the other hand where the electrochemical cell 10 is a cell of a lithium-ion battery, the anode 12 may comprise a conventional porous carbon, the cathode 14 may comprise a conventional metal oxide, and the electrolyte 18 may comprise a conventional lithium salt in a conventional organic solvent.

The number of other electrochemical cells 10 that may also be enhanced by the use of alkali aluminum silicate particles according to the invention is almost limitless. For example nickel-cadmium cells can benefit from the use of the ceramic particles 20 according to the invention, in which case the cathode 14 is nickel oxide, the anode 12 is a cadmium compound, and the electrolyte 18 is a potassium hydroxide solution. Other suitable electrochemical cells enhanced by the use of particles according to the invention include lithium-oxygen, nickel-metal hydride, etc.

In all cases the separator 16 is a permeable membrane which functions to separate the anode 12 and cathode 14 to prevent shorting. The separator 16 may be of any conventional material, such as a polymeric membrane forming a microporous layer. Separator 16 must be chemically and electrochemically stable with regard to the electrolyte and electrode materials and mechanically strong enough to withstand high tension forces during battery construction. Polyolefins are particularly desirable, but some other specific examples of separator 16 materials include nonwoven fibers (cotton, nylon, polyesters, glass), polyethylene or polypropylene films, some ceramics, and possibly even naturally occurring substances like rubber, asbestos, or wood. The particles 20 may, or may not, touch the separator 16.

The source of the loose alkali aluminum silicate particles 20 is preferably selected from the group consisting essentially of zeolite, kyanite, sillimanite, an/or andalusite. One of many commercial suppliers of hydrated alkali aluminum silicate particles for use in the invention is Hess Pumice located in Malad City, Idaho.

Figure 2:
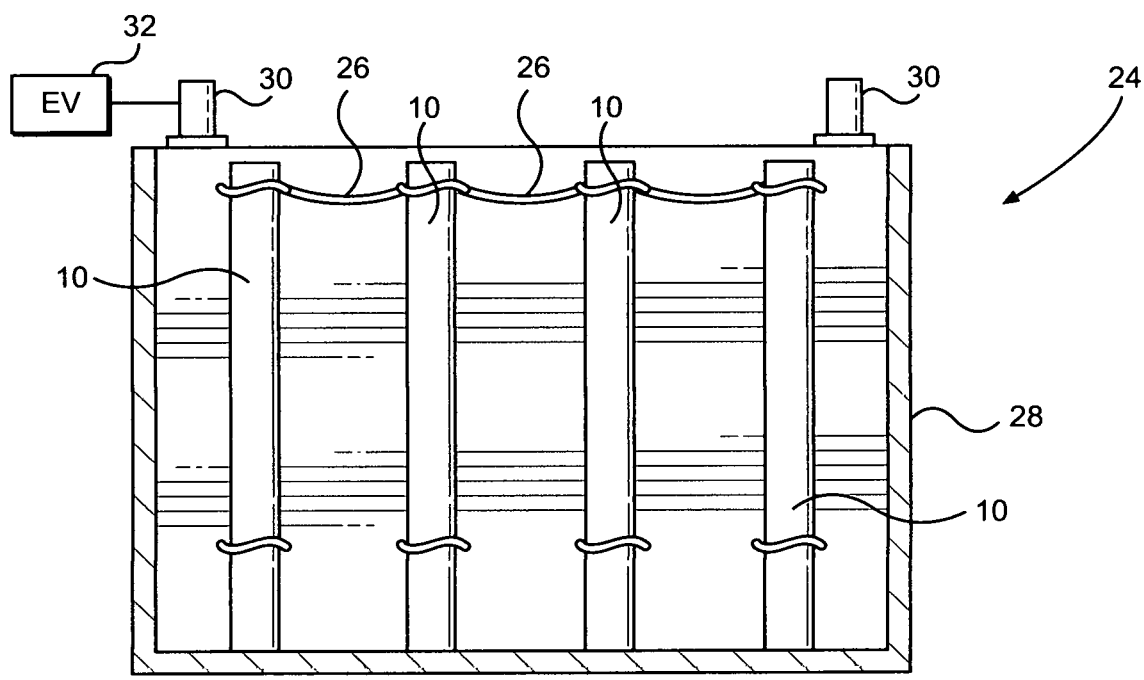
FIG. 2 is a schematic cross-sectional side view of a plurality of the cells of FIG. 1 interconnected in series or parallel to form a battery.

FIG. 2 is a schematic illustration of a plurality of cells 10 according to the invention connected in series or parallel by electrical connectors shown schematically at 26 to form a battery 24, having a common casing 28 which contains all of the cells 10 and their components (anodes, cathodes, electrolytes, separators, and ceramic particles). Terminals 30 are used to connect the battery 24 to any device to be powered thereby. As indicated in FIG. 2 the terminals 30 can be connected to an electric vehicle 32, which may be an EV, UUV, UAV or USV. The battery 24 may be put to any other use for which it is suited.

EXAMPLE

A commercial lead acid twelve volt automobile battery (six cell AUTOCRAFT brand) was taken out of service with less than ⅓ of the charge under load. Two twelve volt conventional automobile incandescent dome lamps were attached to the automobile conventional twelve volt lead-acid battery and were left connected until the battery registered ZERO on a Radio Shack 1015B model ammeter/voltmeter, at which time the dome lamps were disconnected. The initial sulfuric acid based electrolyte in the battery remained, although it would have been desirable to replace it. Hydrated alkali aluminum silicate ceramic in loose particle form (the vast majority of the particles had as their maximum dimensions about 5 mm-10 mm, ranging from substantially spherically shaped to completely irregularly shaped) was then poured by hand into the battery cells until each of the six cells was reasonably full but no electrolyte was expelled, with the particles contacting the anodes and cathodes of the cells. The charge in the battery as registered by the ammeter/voltmeter started to increase as the ceramic particles were poured into the battery cells. Approximately ten hours after the ceramic particles were introduced into the battery cells the ammeter showed an increase in the charge to the end of the red charging sign on the ammeter, without any electrical input from an alternator or any other device, indicating enhanced operability of the electrochemical cells within the battery. The battery was charged by an external source for ten minutes more and the ammeter immediately registered the green fully charged indicator. The car dome lamps were then re-connected and their luminosity matched their initial luminosity. The car dome lamps were left "on" with no loss of charge and continued to run indefinitely with no electrical input indicating enhanced durability of operation of the battery as a result of the introduction of the hydrated alkali aluminum silicate particles.

When manufacturing cells and batteries according to the invention it may be desirable to introduce the substantially loose particles (e. g. using machinery instead of hand-pouring) into the cells before adding liquid or gel electrolyte. Where existing cells or batteries are to be retrofit, it is desirable to replace the electrolyte with fresh liquid or gel electrolyte before adding the ceramic particles. The invention contemplates a method of enhancing the operability of an existing battery by replacing its electrolyte (e. g. with a vacuum or aspirating device not adversely affected by the material of the electrolyte) and then hand or machine pouring loose hydrated alkali aluminum silicate ceramic particles in to the battery cells so that the particles contact both the anode and cathode. In the case of a new battery the ceramic particles may be introduced before or after the electrolyte, or substantially simultaneously.

While the invention has been herein shown and described in what is presently considered the most practical and preferred embodiment, it is to be understood that the invention is to be accorded the broadest interpretation of the appended claims so as to encompass all equivalent structures, apparatus, and methods, limited only by the prior art.

What is claimed is:

1. An electrochemical cell comprising: an anode; a cathode; a separator between said anode and cathode; a liquid or gel electrolyte surrounding said anode and cathode; and a plurality of substantially loose hydrated alkali aluminum silicate particles disposed in said electrolyte and contacting both said anode and said cathode, wherein the majority of said alkali aluminum silicate particles have maximum dimensions between about 5-10 mm.

2. An electrochemical cell as recited in claim 1 wherein said anode is a plate comprising lead oxide, said cathode is a plate comprising lead, and said electrolyte contains sulfuric acid.

3. An electrochemical cell as recited in claim 1 wherein said anode comprises a porous carbon, said cathode comprises a metal oxide, and said electrolyte comprises a lithium salt in an organic solvent.

4. An electrochemical cell as recited in claim 1 wherein the shapes of the substantially loose particles range from substantially spherical to completely irregular.

5. An electrochemical cell as recited in claim 1 wherein said anode is a plate comprising lead oxide, said cathode is a plate comprising lead, and said electrolyte contains sulfuric acid.

6. An electrochemical cell as recited in claim 1 wherein said anode comprises a porous carbon, said cathode comprises a metal oxide, and said electrolyte comprises a lithium salt in an organic solvent.

7. An electrochemical cell as recited in claim 1 wherein the source of said alkali aluminum silicate is selected from the group consisting essentially of zeolite, kyanite, sillimanite, an/or andalusite.

8. A plurality of electrochemical cells as recited in claim 1 connected in series or parallel and contained within a common casing to provide a battery.

9. A battery as recited in claim 8 wherein said battery is a lead-acid or a lithium-ion battery.

10. A battery as recited in claim 8 wherein the shapes of the particles range from substantially spherical to completely irregular.

11. A battery as recited in claim 8 wherein said battery is a lead-acid battery or a lithium-ion battery.

12. A battery as recited in claim 8 operatively connected to an EV, UUV, UAV, or USV.

13. A battery comprising a plurality of positive electrodes separated from a plurality of negative electrodes, all connected in series or parallel; and a plurality of substantially loose particles of hydrated alkali aluminum silicate contacting said positive and negative electrodes.

14. A method of facilitating operation of a battery having a plurality of operatively connected electrochemical cells each including an anode and a cathode separated by a separator, the method comprising: introducing a plurality of substantially loose particles of hydrated alkali aluminum silicate into contact with both the anode and cathode of at least some of the cells, wherein the majority of said alkali aluminum silicate particles have maximum dimensions between about 5-10 mm.

15. A method as recited in claim 14 wherein the battery is an existing battery having a liquid or gel electrolyte; and further comprising removing and replacing the electrolyte before introducing the particles.

16. A method as recited in claim 14 wherein the battery is a new battery, and further comprising introducing liquid or gel electrolyte into the cells before, after, or substantially simultaneously with, the introduction of the particles.

17. A method as recited in claim 14 wherein the majority of the alkali aluminum silicate particles have with shapes that are substantially spherical, completely irregular, or both.

\* \* \* \* \*